US011138029B2

(12) United States Patent
Divakara et al.

(10) Patent No.: US 11,138,029 B2
(45) Date of Patent: Oct. 5, 2021

(54) MITIGATION OF IMPACT OF INTERMITTENT STORAGE UNAVAILABILITY ON VIRTUAL MACHINES

(71) Applicant: Microsoft Technology Licensing, LLC, Redmond, WA (US)

(72) Inventors: Vivek P. Divakara, Bellevue, WA (US); Suraj Puri, Redmond, WA (US); Raghu Murthy, Redmond, WA (US); Kai Chen, Bellevue, WA (US); Francis M. David, Bellevue, WA (US); Melur Raghuraman, Sammamish, WA (US); Mian Naeem ul Haque, Bothell, WA (US); Saad Syed, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/805,800

(22) Filed: Jul. 22, 2015

(65) Prior Publication Data
US 2017/0024233 A1 Jan. 26, 2017

(51) Int. Cl.
*G06F 9/455* (2018.01)
(52) U.S. Cl.
CPC .. *G06F 9/45558* (2013.01); *G06F 2009/4557* (2013.01); *G06F 2009/45575* (2013.01);
(Continued)
(58) Field of Classification Search
CPC ......... G06F 9/45558; G06F 2009/4557; G06F 2009/45579; G06F 2009/45583; G06F 2009/45575
See application file for complete search history.

(56) References Cited

U.S. PATENT DOCUMENTS 4,674,038 A 6/1987 Brelsford et al.
4,912,628 A 3/1990 Briggs
(Continued)

FOREIGN PATENT DOCUMENTS

CN 102414673 A 4/2012

OTHER PUBLICATIONS

Hou, et al., "HydraVM: Low-Cost, Transparent High Availability for Virtual Machines", In Technical Report, Feb. 21, 2011, 12 pages.
(Continued)

*Primary Examiner* — Emerson C Puente
*Assistant Examiner* — Jonathan R Labud
(74) *Attorney, Agent, or Firm* — Fiala & Weaver P.L.L.C.

(57) ABSTRACT

A virtual machine hosting environment executing on a physical machine is operable to instantiate a virtual machine that is capable of initiating I/O operations directed to a remote storage. The virtual machine hosting environment is operable to determine when an unavailability condition exists with respect to the remote storage and when such unavailability condition no longer exists. The virtual machine hosting environment is further operable to suspend the virtual machine based at least on the determination that the unavailability condition exists and to resume the virtual machine based at least on the determination that the unavailability condition no longer exists. The virtual machine hosting environment may be still further operable to save one or more pending I/O requests generated by the virtual machine in conjunction with pausing the virtual machine and to send the pending I/O request(s) to the remote storage in conjunction with resuming the virtual machine.

20 Claims, 9 Drawing Sheets

(52) U.S. Cl.
CPC ............. *G06F 2009/45579* (2013.01); *G06F 2009/45583* (2013.01)

(56) References Cited

U.S. PATENT DOCUMENTS

| | | | |
|---|---|---|---|
| 5,790,779 A * | 8/1998 | Ben-Natan | G06F 11/0775 714/39 |
| 7,213,246 B1 | 5/2007 | van Rietschote et al. | |
| 7,809,985 B2 | 10/2010 | Chen et al. | |
| 8,326,803 B1 * | 12/2012 | Stringham | G06F 3/067 707/652 |
| 8,751,857 B2 | 6/2014 | Frenkel et al. | |
| 8,825,851 B2 | 9/2014 | Nayak et al. | |
| 8,914,567 B2 | 12/2014 | Miroshnichenko et al. | |
| 9,348,646 B1 * | 5/2016 | Daya | G06F 9/4856 |
| 2006/0271677 A1 * | 11/2006 | Mercier | G06F 17/30197 709/224 |
| 2008/0155223 A1 | 6/2008 | Hiltgen et al. | |
| 2009/0249335 A1 | 10/2009 | Vasilevsky et al. | |
| 2010/0274983 A1 * | 10/2010 | Murphy | G06F 11/1456 711/162 |
| 2011/0055372 A1 | 3/2011 | Elyashev et al. | |
| 2011/0179414 A1 * | 7/2011 | Goggin | G06F 3/061 718/1 |
| 2011/0314470 A1 * | 12/2011 | Elyashev | G06F 11/1484 718/1 |
| 2012/0042034 A1 * | 2/2012 | Goggin | G06F 3/0647 709/216 |
| 2012/0159454 A1 | 6/2012 | Barham et al. | |
| 2013/0055261 A1 | 2/2013 | Han et al. | |
| 2014/0059392 A1 * | 2/2014 | Ren | G06F 11/301 714/47.1 |
| 2014/0173213 A1 | 6/2014 | Beveridge | |
| 2014/0181397 A1 * | 6/2014 | Bonzini | G06F 12/16 711/112 |
| 2014/0337285 A1 * | 11/2014 | Gokhale | G06F 11/1464 707/610 |
| 2014/0366019 A1 | 12/2014 | Bajaj et al. | |

OTHER PUBLICATIONS

Farr, et al., "A Case for High Availability in a Virtualized Environment (HAVEN)", In Proceedings of 3rd International Conference on Availability, Reliability and Security, Mar. 4, 2008, pp. 675-682.

"Second Written Opinion Issued in PCT Application No. PCT/US2016/043218", dated Jul. 6, 2017, 6 Pages.

"International Search Report and Written Opinion Issued in PCT Application No. PCT/US2016/043218", dated Oct. 11, 2016, 11 Pages.

"International Preliminary Report on Patentability Issued in PCT Application No. PCT/US2016/043218", dated Nov. 17, 2017, 9 Pages.

"Office Action Issued in European Patent Application No. 16745952. 8", dated Apr. 17, 2019, 4 Pages.

"Office Action and Search Report Issued in Chinese Patent Application No. 201680042757.4", dated Feb. 25, 2021, 12 Pages.

* cited by examiner

MITIGATION OF IMPACT OF INTERMITTENT STORAGE UNAVAILABILITY ON VIRTUAL MACHINES

BACKGROUND

A virtual machine is an operating system or application environment that is supported by software that imitates dedicated hardware. The end user has essentially a similar experience on a virtual machine as they would have on dedicated hardware. Specialized software (sometimes referred to as a hypervisor or a virtual machine monitor) emulates hardware resources of the physical machine upon which the virtual machine is installed, such as a central processing unit, system memory, hard disk, and network interface. This emulation enables multiple virtual machines to share the same hardware resources. The specialized software may be able to emulate multiple virtual hardware platforms that are isolated from each other, allowing virtual machines to run different server operating systems on the same underlying physical host. Virtualization can save costs by reducing the need for physical hardware systems. Virtual machines can use hardware more efficiently, which lowers the quantity of hardware and associated maintenance costs, and reduces power and cooling demand. Administrators can take advantage of virtual environments to simplify backups, disaster recovery, new deployments and basic system administration tasks.

Virtual machines have become a key technology in realizing an "infrastructure-as-a-service" model in which computational capacity, in the form of virtual machines deployed in a resource provider's datacenter, is provisioned on-demand as a service. For example, in a virtualized data center, the information technology (IT) staff can spin up new virtual machines based on user demand or a new project. The use of virtual machines in this context offers multiple benefits, including the ability to securely partition physical servers and to provide service recipients with customized software environments.

A virtual machine may be executed in an infrastructure in which a storage device is used to provide storage (e.g., disk storage) services to the virtual machine. The storage device may be "remote" in that it is connected to the physical machine upon which the virtual machine is running via a network. If the remote storage device experiences intermittent unavailability issues (e.g., due to issues with the network and/or the remote storage device itself), then the virtual machine may encounter input/output (I/O) errors or unacceptably high I/O latencies. This can result in undesired behavior by software executing within the virtual machine that could lead to application as well as operating system crashes.

SUMMARY

Systems, methods and computer program products are described herein that mitigate the impact of intermittent storage unavailability on virtual machines. In accordance with embodiments, a virtual machine hosting environment executing on a physical machine is operable to instantiate a virtual machine for execution on the physical machine. The virtual machine is cable of initiating I/O operations that are directed to remote storage to which the physical machine is communicatively connected. The virtual machine hosting environment is further operable to determine that an unavailability condition exists with respect to the remote storage and to suspend the virtual machine in response to at least the determination that the unavailability condition exists. The virtual machine hosting environment may be further operable to determine that the unavailability condition no longer exists and to resume the virtual machine in response to at least the determination that the unavailability condition no longer exists. The virtual machine hosting environment may be still further operable to save one or more pending I/O requests generated by the virtual machine in conjunction with pausing the virtual machine and to send the one or more pending I/O requests to the remote storage in conjunction with resuming the virtual machine.

In an alternate embodiment, the virtual machine hosting environment may be operable to terminate the virtual machine in response to at least the determination that the unavailability condition exists and to restart the virtual machine in response to at least the determination that the unavailability condition no longer exists.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

Figure 1:
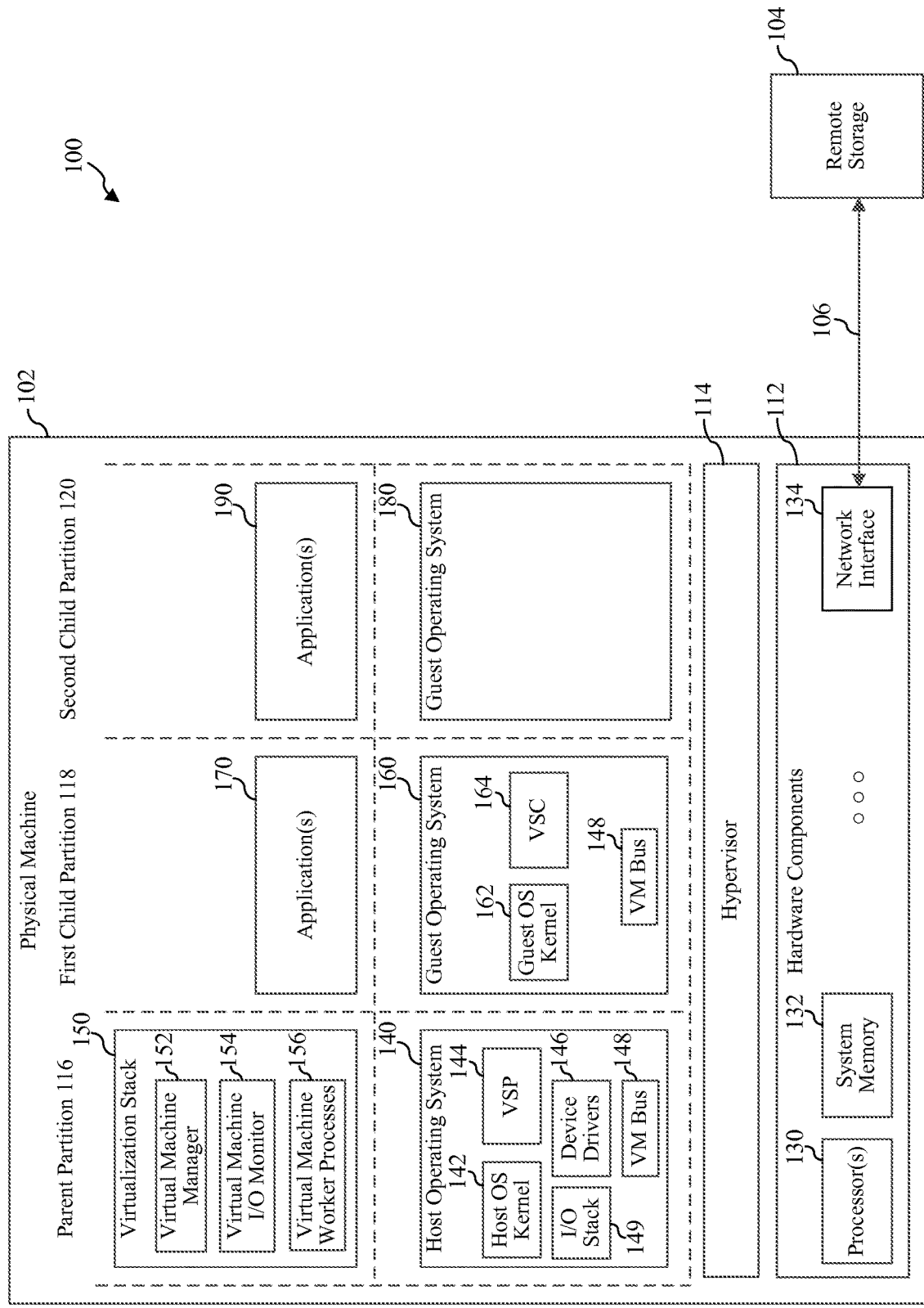
FIG. 1 is a block diagram of a system that includes a virtual machine hosting environment that is operable to mitigate the impact of intermittent storage unavailability on virtual machines hosted thereby.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As discussed in the Background Section, above, a virtual machine may be executed in an infrastructure in which a remote storage device is used to provide storage (e.g., disk storage) services to the virtual machine. For example, storage services may be provided to the virtual machine by a remote storage device that is connected via a network to the physical machine upon which the virtual machine is running. If the remote storage device experiences intermittent unavailability issues (e.g., due to issues with the network and/or the remote storage device itself), then the virtual machine may encounter I/O errors or unacceptably high I/O latencies. This can result in undesired behavior by software executing within the virtual machine that could lead to application as well as operating system crashes.

A virtual machine hosting environment is described herein that can mitigate the impact of such intermittent storage unavailability on one or more virtual machines executing within the hosting environment. In particular, a virtual machine hosting environment is described herein that executes on a physical machine. The virtual machine hosting environment is operable to instantiate a virtual machine for execution on the physical machine. The virtual machine is capable of initiating I/O operations directed to a remote storage to which the physical machine is communicatively connected. The virtual machine hosting environment is further operable to determine that an unavailability condition exists with respect to the remote storage and to suspend the virtual machine in response to at least the determination that the unavailability condition exists. The virtual machine hosting environment may be further operable to determine that the unavailability condition no longer exists and to resume the virtual machine in response to at least the determination that the unavailability condition no longer exists. The virtual machine hosting environment may be still further operable to save one or more pending I/O requests generated by the virtual machine in conjunction with pausing the virtual machine and to send the one or more pending I/O requests to the remote storage in conjunction with resuming the virtual machine.

By suspending the virtual machine during periods when the remote storage is deemed unavailable, embodiments described herein can advantageously help prevent software executing within the virtual machine from exhibiting undesired behavior that may be brought on by I/O errors or I/O latency and that can lead to application or operating system crashes. In further accordance with embodiments described herein, when the virtual machine hosting environment resumes the virtual machine, the virtual machine may experience a jump in "wall clock" time and its network connection may have been timed out by its peers, but the software and data inside the virtual machine are preserved and available for continued processing. Any pending I/O requests that were saved by the virtual machine hosting environment when the virtual machine was suspended can be resolved by accessing the remote storage after the virtual machine is resumed.

As will be described herein, the virtual machine hosting environment may determine that the unavailability condition exists with respect to the remote storage by, for example, monitoring I/O operations initiated by the virtual machine and/or other virtual machines executing on the physical machine. The virtual machine hosting environment may also determine that the unavailability condition exists based on I/O status information received from one or more other physical machines.

As will also be described herein, the virtual machine hosting environment may determine that the unavailability condition no longer exists by intermittently probing the remote storage in a lightweight (e.g., relatively infrequent) fashion until a response is received therefrom that indicates that the unavailability condition no longer exists. The virtual machine hosting environment may also determine that the unavailability condition no longer exists by intermittently retrying I/O operations directed to the remote storage until those I/O operations succeed. Still further, the virtual machine hosting environment may determine that the unavailability condition no longer exists based on I/O status information received from one or more other physical machines.

In an alternate embodiment, the virtual machine hosting environment may be operable to terminate the virtual machine in response to at least the determination that the unavailability condition exists and to restart the virtual machine in response to at least the determination that the unavailability condition no longer exists. Such an approach may be utilized, for example, where an application or operating system running on a virtual machine does not respond well to the jump in "wall clock" time that occurs when a virtual machine is suspended and resumed. In such a case, it may be deemed preferable to terminate the virtual machine during a period of remote storage unavailability and restart the virtual machine after such period ends, even if such termination may result in the crashing of an application or operating system running on the virtual machine. In further embodiments, different policies for dealing with intermittent remote storage unavailability (e.g., suspend/resume versus terminate/restart) may be selectively applied to different virtual machines depending on the applications and/or operating systems executed by the virtual machines, based on user/customer preference, or based on some other criteria.

Systems, methods and computer program products for mitigating the effects of intermittent storage unavailability on virtual machines will be more fully described in the following sections. In particular, Section II describes an example system that includes a virtual machine hosting environment that is operable to mitigate the impact of intermittent storage unavailability on virtual machines hosted thereby. Section II further describes exemplary methods and computer program products for mitigating the impact of intermittent storage unavailability on virtual machines. Section III describes an example processor-based computer system that may be used to implement various embodiments. Section IV describes some additional exemplary embodiments. Section V provides some concluding remarks.

II. Exemplary Systems, Methods and Computer Program Products for Mitigating the Impact of Intermittent Storage Unavailability on Virtual Machines FIG. 1 is a block diagram of a system 100 that includes a virtual machine hosting environment that is operable to mitigate the impact of intermittent storage unavailability on virtual machines hosted thereby. As shown in FIG. 1, system 100 includes a physical machine 102 and a remote storage 104 that is connected thereto via one or more networks 106.

Physical machine 102 represents a hardware-based device and may comprise, for example, a hardware-based computing device. As used herein, the term "device" refers to a machine or other tangible, manufactured object and excludes software and signals. Physical machine 102 includes a plurality of hardware components 112. Hardware components 112 include, but are by no means limited to, one or more processors 130, a system memory 132, and a network interface 134. Hardware components 112 may include additional components that are not shown in FIG. 1. Such additional components may include, for example and without limitation, a hard disk drive, a magnetic disk drive, an optical disk drive, a serial port, a display, or a user input device.

Processor(s) 130 may comprise one or more microprocessors, each of which may comprise one or more central processing units (CPUs) or microprocessor cores. Processor(s) 130 may be implemented using other types of integrated circuits as well. Processor(s) 130 operate in a well-known manner to execute computer programs (also referred to herein as computer program logic, software, and software components). The execution of such computer programs causes processor(s) 130 to perform operations including operations that will be described herein. Each of system memory 132, network interface 134, and various other hardware components 112 of physical machine 102 is connected to processor(s) 130 via one or more suitable interfaces.

System memory 132 comprises one or more computer-readable memory devices that operate to store computer programs and data. The computer programs stored by system memory 132 may be executed by processor(s) 130 in a well-known manner. System memory 132 may be implemented using any of a wide variety of computer-readable memory devices including, but not limited to, random access memory (RAM) devices. Computer programs and data may be loaded into system memory 132, for example, from a hard drive or other memory device within hardware components 112 or from remote storage 104.

Network interface 134 comprises an interface that enables physical machine 102 102 to communicate over network(s) 106. For example, network interface 134 may comprise a wired network interface such as an Ethernet interface. As another example, network interface 134 may comprise a wireless network interface such as an IEEE 802.11 ("Wi-Fi") interface or a 3G telecommunication interface. However, these are examples only and are not intended to be limiting.

A number of software components are executed by physical machine 102. In particular, these software components are executed by processor(s) 130. During execution, some of these software components may utilize and/or interact with various ones of hardware components 112 of physical machine 102. Generally speaking, these software components include but are not limited to a virtual machine hosting environment and one or more virtual machines that are hosted by such hosting environment.

The software components of physical machine 102 that may be said to comprise the virtual machine hosting environment include a hypervisor 114, a host operating system 140, and a virtualization stack 150. Each of these components is loaded into system memory 132 and executed therefrom by processor(s) 130.

Hypervisor 114 comprises a software component that acts as an interface between one or more operating systems and hardware components 112 of physical machine 102. Hypervisor 114 operates to provide isolated execution environments which may be referred to as partitions. In the example shown in FIG. 1, hypervisor 114 has created a parent (or root) partition 116, a first child partition 118, and a second child partition 120. Hypervisor 114 presents emulated representations of hardware components 112 to each of the partitions and controls and arbitrates access to hardware components 112 on behalf of software components executing within the partitions.

Parent partition 116 is a partition within which a host operating system 140 of physical machine 102 is executed. Generally speaking, parent partition 116 manages machine-level functions such as device drivers 146, power management, and device hot addition/removal. Parent partition 116 is the only partition that has direct access to system memory 132 and the other devices within hardware components 112.

Among other features, host operating system 140 includes a host operating system kernel 142, a virtualization service provider (VSP) 144, a plurality of device drivers 146 and a virtual machine (VM) bus 148, all of which operate within a kernel mode of parent partition 116. Host operating system kernel 142 includes components of host operating system 140 that interact with hardware components 112 via device drivers 146. VSP 144 is operable to provide synthetic device support to child partitions that include virtualization service clients (VSCs) over VM bus 148. VM bus 148 comprises a channel-based point-to-point in-memory bus architecture, running fully in kernel mode. In one embodiment, host operating system 140 comprises a server operating system, such as a version of a MICROSOFT® WINDOWS SERVER® that is operating in a Hyper-V role, although this example is by no means limiting.

Virtualization stack 150 comprises software components running in a user mode within parent partition 116. Such components may be said to be running "on top of" host operating system 140. As shown in FIG. 1, virtualization stack 150 includes a virtual machine manager 152 and virtual machine worker processes 156.

Virtual machine manager 152 is operable to manage all the virtual machines executing in the child partitions on physical machine 102. Operations that may be performed by virtual machine manager 152 include, but are not limited to creating or instantiating a virtual machine, terminating or destroying a virtual machine, pausing or suspending a virtual machine, resuming a virtual machine, obtaining a list of running virtual machines, obtaining performance and utilization statistics for a virtual machine, or the like. Although not shown in FIG. 1, virtual machine manager 152 may comprise a user interface via which a user can invoke the functionality thereof.

Each one of virtual machine worker processes 156 provides virtual machine management services from parent partition 116 to a corresponding guest operating system running in a child partition. Virtual machine manager 152 spawns a separate virtual machine worker process for each running virtual machine.

In the example shown in FIG. 1, virtual machine manager 152 has instantiated a first virtual machine which is represented by first child partition 118 and a second virtual machine which is represented by second child partition 120. However, this is merely an example. The virtual machine hosting environment shown in FIG. 1 may be used to concurrently host more than two virtual machines as well as only one virtual machine.

A guest operating system 160 is running within a kernel mode of the virtual machine of first child partition 118. Guest operating system 160 includes a guest operating system kernel 162, a virtualization service client (VSC) 164, and VM bus 148. Guest operating system kernel 162 comprises a core component of guest operating system 162. VSC 164 is a synthetic device instance that resides in first child partition 118. VSC 164 utilizes hardware resources that are provided thereto by VSP 144 in parent partition 116. VSC 164 communicates with VSP 144 over VM bus 148.

One or more applications 170 are running within a user mode of the virtual machine of first child partition 118. Such application(s) may be said to run "on top of" guest operating system 160.

A guest operating system 180 is running within a kernel mode of the virtual machine of second child partition 120. Guest operating system 180 does not include a VSC, so requests for hardware resources generated by guest operating system 180 (for itself or on behalf of application(s) 190) are handled by hypervisor 114.

One or more applications 190 are running within a user mode of the virtual machine of second child partition 120. Such application(s) may be said to run "on top of" guest operating system 180.

In system 100, remote storage 104 is utilized to provide non-volatile storage (e.g., disk storage) on behalf of each of the virtual machines running on physical machine 102. Remote storage 104 may comprise any device, system or service that is capable of providing non-volatile (e.g., disk type) storage remotely. In one embodiment, remote storage 104 comprises a cloud-based storage service such as MICROSOFT® AZURE® STORAGE, AMAZON® ELASTIC BLOCK STORAGE (EBS), AMAZON® SIMPLE STORAGE SERVICE (S3), or the like. In another embodiment, remote storage 104 comprises a storage device such as a network attached storage device, disk array, tape library, optical or magnetic disk drive, or the like. In yet another embodiment, remote storage 104 comprises a storage area network. However, these are only examples and are not intended to be limiting.

Networks(s) 106 that connect physical machine 102 to remote storage 104 is intended to represent any type of network or combination of networks suitable for facilitating communication between devices, such as between physical machine 102 and one or more devices that comprise remote storage 104. Network(s) 106 may include, for example and without limitation, a local area network, a wide area network, a private network, a public network, a packet network, a circuit-switched network, a wired network, and/or a wireless network.

Host operating system 140 includes the device driver(s) necessary for directing I/O requests via network interface 134 to remote storage 104. Such device driver(s) comprise part of device drivers 146. When an application (e.g., one of application(s) 170 or one of application(s) 190) or guest operating system (e.g., guest operating system 160 or guest operating system 180) executing within a virtual machine generates an I/O request, such I/O request will be delivered to host operating system 140 by either VSC 164 (in the case of the virtual machine of first child partition 118) or by hypervisor 114 (in the case of the virtual machine of second child partition 120) and queued in an I/O stack 149 for servicing by the appropriate device driver(s). Host operating system 140 will maintain such I/O requests in I/O stack 149 until such I/O requests are resolved. An I/O request may be resolved, for example, when a successful read/write occurs at remote storage 104 and an I/O response indicating the same is sent back from remote storage 104. Such I/O response will be forwarded by host operating system 140 to the virtual machine that generated the corresponding I/O request.

In the embodiment shown in FIG. 1, it is possible that remote storage 104 may become temporarily unavailable. This may occur, for example, due to issues with network(s) 106 or with remote storage 104. In such a scenario, the virtual machines of first child partition 118 and second child partition 120 may encounter I/O errors or unacceptably high I/O latencies. In an I/O error situation, remote storage 104 will deliver an I/O error message to host operating system 140 that indicates that an I/O request pending in I/O stack 149 cannot be serviced. In an I/O latency situation, I/O requests will remain pending on I/O stack 149 for a relatively long amount of time due to a delayed I/O response from remote storage 104. In conventional implementations, either of these situations can result in undesired behavior by software executing within each virtual machine that could lead to application as well as operating system crashes.

To address this issue, virtualization stack 150 executing on physical machine 102 includes a virtual machine I/O monitor 154 as shown in FIG. 1. Virtual machine I/O monitor 154 is operable to determine when an unavailability condition exists with respect to remote storage 104 and to notify virtual machine manager 152 of the same. Virtual machine manager 152 is operable to suspend each virtual machine executing on physical machine 102 that relies on remote storage 104 in response to at least receiving such notification. Virtual machine manager 152 is also operable to save one or more pending I/O requests (e.g., I/O requests pending in I/O stack 149) generated by each such virtual machine in conjunction with suspending the virtual machines. Virtual machine I/O monitor 154 is further operable to determine when the unavailability condition no longer exists (i.e., to determine when remote storage 104 has become available again) and to notify virtual machine manager 152 of the same. Virtual machine manager 152 is further operable to resume the suspended virtual machines in response to receiving at least such notification. Virtual machine manager 152 is also operable to send the saved pending I/O requests to remote storage 104 in conjunction with resuming the virtual machines.

By suspending the virtual machines of first child partition 118 and second child partition 120 during periods when remote storage 104 is deemed unavailable, the virtual machine hosting environment of FIG. 1 can advantageously help prevent software executing within these virtual machines from exhibiting undesired behavior that may be brought on by I/O errors or I/O latency and that can lead to application or operating system crashes. When the virtual machine hosting environment of FIG. 1 resumes each of the virtual machines of first child partition 118 and second child partition 120, each such virtual machine may experience a jump in "wall clock" time and its network connection may have been timed out by its peers, but the software and data inside the virtual machine are preserved and available for continued processing. As noted above, any pending I/O requests that were saved by the virtual machine hosting environment of FIG. 1 when the virtual machine was suspended can be resolved by accessing remote storage 104 after the virtual machine is resumed.

It is noted that the virtual machine hosting environment described above in reference to FIG. 1 is merely one example of how a virtual machine hosting environment may be structured. As will be appreciated by persons skilled in the relevant art(s), there are a variety of different software architectures that may be used to implement a virtual machine hosting environment. The techniques described herein for mitigating the impact of intermittent storage unavailability are not limited to the embodiment shown in FIG. 1 and are generally applicable to any type of virtual machine hosting environment.

Figure 2:
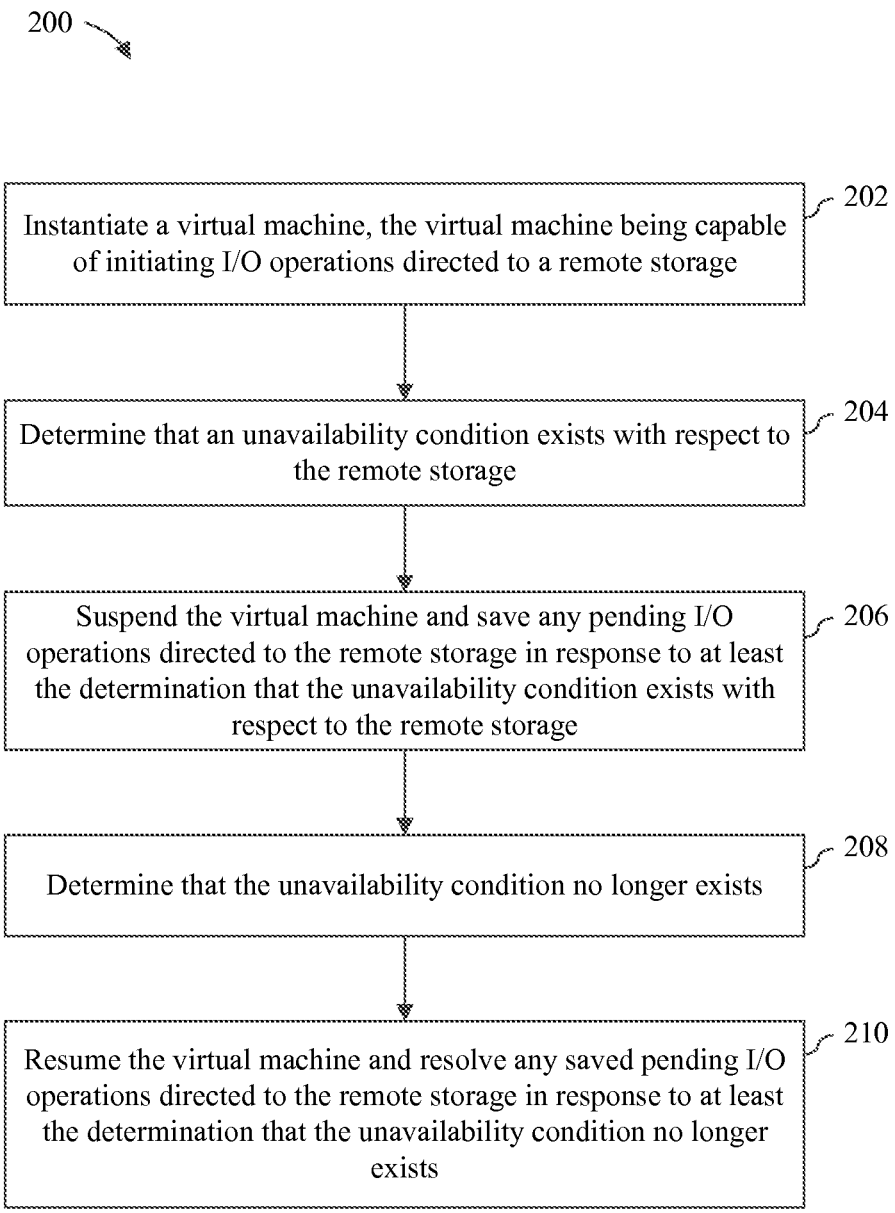
FIG. 2 depicts a flowchart of a method for mitigating the impact of intermittent storage unavailability on virtual machines.

The foregoing approach to mitigating the impact of intermittent storage unavailability on virtual machines will be further described in reference to FIG. 2. In particular, FIG. 2 depicts a flowchart 200 of a method for mitigating the impact of intermittent storage unavailability on virtual machines. The method of flowchart 200 will be described with continued reference to system 100 of FIG. 1. However, the method is not limited to that embodiment. For example, the method of flowchart 200 may be performed by any of a wide variety of virtual machine hosting environments other than the particular one shown in FIG. 1.

As shown in FIG. 2, the method of flowchart 200 begins at step 202 in which a virtual machine hosting environment executing on a physical machine instantiates a virtual machine for execution on the physical machine. The virtual machine is capable of initiating I/O operations directed to a remote storage to which the physical machine is communicatively connected. By way of example, this step may be performed when virtual machine manager 152 executing on physical machine 102 instantiates the virtual machine of first child partition 118 for execution on physical machine 102. As noted above, the virtual machine of first child partition 118 is capable of initiating I/O operations that will ultimately be directed to remote storage 104 to which physical machine 102 is communicatively connected via network(s) 106.

At step 204, the virtual machine hosting environment determines that an unavailability condition exists with respect to the remote storage. By way of example, this step may be performed when virtual machine I/O monitor 154 executing on physical machine 102 determines that an unavailability condition exists with respect to remote storage 104. As used herein, the term "unavailability condition" encompasses a condition or state in which one or more I/O operations directed to the remote storage have been delayed or failed as well as a condition or state in which it is anticipated that one or more I/O operations directed to the remote storage will be delayed or fail. Various techniques for determining that an unavailability condition exists with respect to the remote storage will be described below.

At step 206, the virtual machine hosting environment suspends the virtual machine and saves any pending I/O operations directed to the remote storage in response to at least the determination that the unavailability condition exists with respect to the remote storage. By way of example, this step may be performed when virtual machine manager 152 executing on physical machine 102 performs the following operations in response to at least receiving a notification from virtual machine I/O monitor 154 that an unavailability condition exists with respect to remote storage 104: (1) suspend the virtual machine of child partition 118 and (2) save any pending I/O operations in I/O stack 149 that were generated on behalf of the virtual machine of child partition 118 and are directed to remote storage 104.

As will be appreciated by persons skilled in the relevant art(s), suspending a virtual machine may entail prohibiting one or more virtual processors within the virtual machine from being scheduled on the physical processors of the physical machine. This disables the virtual processor(s) from doing and work and essentially "freezes" the virtual machine. In this suspended state, the virtual machine has no notion of time. During the suspended state, all virtual machine state is preserved so that the virtual machine processor(s) can more or less seamlessly continue execution from the point of suspension whenever the virtual machine is resumed.

Saving the pending I/O operations may entail simply maintaining the pending I/O operations on an I/O stack (e.g., I/O stack 149) or removing the pending I/O operations from an I/O stack and saving them in a buffer or other temporary storage until such time as the operations can be reinserted onto the I/O stack. Still other techniques for saving the pending I/O operations may be used.

At step 208, the virtual machine hosting environment determines that the unavailability condition no longer exists. By way of example, this step may be performed when virtual machine I/O monitor 154 executing on physical machine 102 determines that an unavailability condition no longer exists with respect to remote storage 104. Various techniques for determining that an unavailability condition no longer exists with respect to a remote storage will be described below.

At step 210, the virtual machine hosting environment resumes the virtual machine and resolves any saved pending I/O operations directed to the remote storage in response to at least the determination that the unavailability condition no longer exists. By way of example, this step may be performed when virtual machine manager 152 executing on physical machine 102 performs the following operations in response to at least receiving a notification from virtual machine I/O monitor 154 that an unavailability condition no longer exists with respect to remote storage 104: (1) resume the virtual machine of child partition 118 and (2) resolve any saved pending I/O operations that were generated on behalf of the virtual machine of child partition 118 and are directed to remote storage 104.

As will be appreciated by persons skilled in the relevant art(s), resuming a suspended virtual machine may entail re-enabling one or more virtual processors within the virtual machine to be scheduled on the physical processors of the physical machine. This re-enables the virtual processor(s) to do work and essentially "unfreezes" the virtual machine. Upon being resumed, the virtual machine may experience a jump in "wall clock" time and its network connection may have been timed out by its peers, but as noted above the software and data inside the virtual machine have been preserved and are available for continued processing.

Resolving the saved pending I/O operations may entail issuing the saved pending I/O operations from an I/O stack (e.g., I/O stack 149) to the remote storage. In an embodiment in which saving the pending I/O operations involves removing the saved pending I/O operations from an I/O stack and temporarily storing them elsewhere, this step may also entail reinserting the saved pending I/O operations into the I/O stack.

Figure 3:
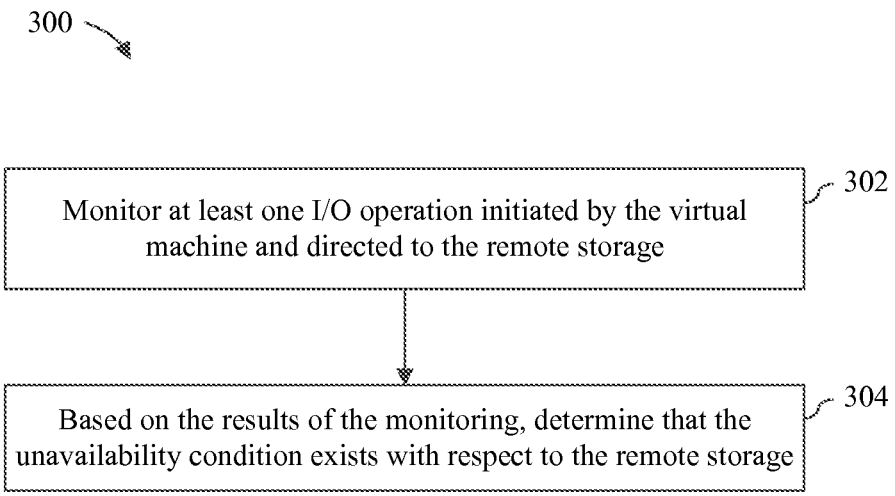
FIG. 3 depicts a flowchart of a first method by which a virtual machine hosting environment may determine that an unavailability condition exists with respect to a remote storage.

The virtual machine hosting environment may use a variety of techniques to determine that the unavailability condition exists with respect to the remote storage in step 204. By way of example, FIG. 3 depicts a flowchart 300 of a first method by which a virtual machine hosting environment may determine that an unavailability condition exists with respect to a remote storage. The method of flowchart 300 will be described with continued reference to system 100 of FIG. 1. However, the method is not limited to that embodiment. For example, the method of flowchart 300 may be performed by any of a wide variety of virtual machine hosting environments other than the particular one shown in FIG. 1.

As shown in FIG. 3, the method of flowchart 300 begins at step 302, in which the virtual machine hosting environment monitors at least one I/O operation initiated by a virtual machine and directed to the remote storage. By way of example, this step may be performed when virtual machine I/O monitor 154 monitors at least one I/O operation initiated by the virtual machine of first child partition 118 that is ultimately directed to remote storage 104. In further accordance with this example, this step may entail monitoring at least one I/O operation pending on I/O stack 149. Monitoring the at least one I/O operation may involve, for example and without limitation, monitoring whether at least one I/O operation succeeds or fails (e.g., results in the receipt of an error message) or determining how long it takes for at least one I/O operation to be completed.

At step 304, based on the results of the monitoring of step 302, the virtual machine hosting environment determines that the unavailability condition exists with respect to the remote storage. By way of example, this step may be performed when virtual I/O monitor 154 determines that an unavailability condition exists with respect to remote storage 104 based on the results of the monitoring of step 302. This step may entail, for example and without limitation, determining that the unavailability conditions exists because an I/O error was received for one or more monitored I/O operations or because a latency associated with one or more monitored I/O operations is determined to exceed a threshold. However, other criteria relating to monitored I/O operation(s) may be used to determine that the unavailability condition exists.

Figure 4:
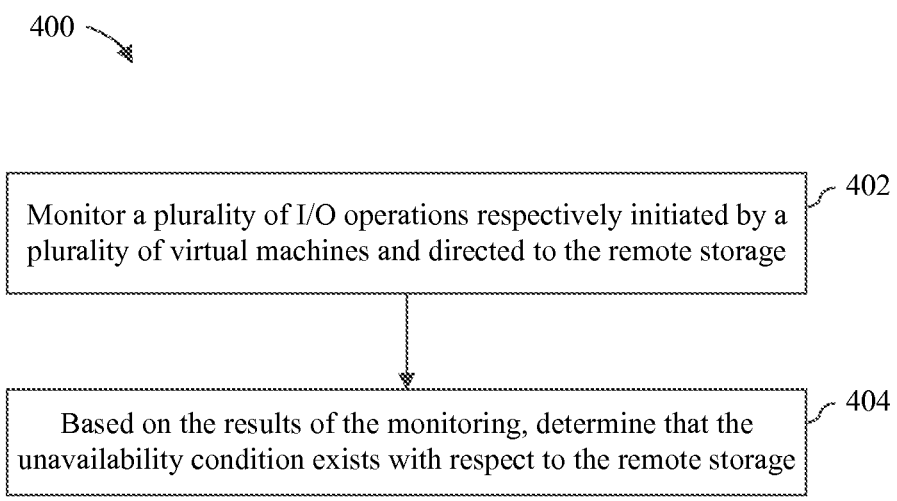
FIG. 4 depicts a flowchart of a second method by which a virtual machine hosting environment may determine that an unavailability condition exists with respect to a remote storage.

In the method of flowchart 300, one or more I/O operations of a single virtual machine are monitored to determine that the unavailability condition exists. As noted above, this results in the suspension of the virtual machine. However, in an alternate embodiment, I/O operations initiated by a plurality of virtual machines executing on the same physical machine may be monitored to determine whether or not the unavailability condition exists. This embodiment will now be described with respect to FIG. 4. In particular, FIG. 4 depicts a flowchart 400 of a second method by which a virtual machine hosting environment may determine that an unavailability condition exists with respect to a remote storage. The method of flowchart 400 will be described with continued reference to system 100 of FIG. 1. However, the method is not limited to that embodiment. For example, the method of flowchart 400 may be performed by any of a wide variety of virtual machine hosting environments other than the particular one shown in FIG. 1.

As shown in FIG. 4, the method of flowchart 400 begins at step 402, in which the virtual machine hosting environment monitors a plurality of I/O operations respectively initiated by a plurality of virtual machines and directed to the remote storage. By way of example, this step may be performed when virtual machine I/O monitor 154 monitors at least one I/O operation initiated by the virtual machine of first child partition 118 that is ultimately directed to remote storage 104 as well as at least one I/O operation initiated by the virtual machine of second child partition 120 that is ultimately directed to remote storage 104. Monitoring the plurality of I/O operations may involve, for example and without limitation, monitoring whether each I/O operation succeeds or fails (e.g., results in the receipt of an error message) or determining how long it takes for each I/O operation to be completed.

At step 404, based on the results of the monitoring of step 402, the virtual machine hosting environment determines that the unavailability condition exists with respect to the remote storage. By way of example, this step may be performed when virtual I/O monitor 154 determines that an unavailability condition exists with respect to remote storage 104 based on the results of the monitoring of step 402. This step may entail, for example and without limitation, determining that the unavailability conditions exists because an I/O error was received for one or more monitored I/O operations or because a latency associated with one or more monitored I/O operations is determined to exceed a threshold. However, other criteria relating to monitored I/O operation(s) may be used to determine that the unavailability condition exists.

In accordance with the embodiment represented by FIG. 4, an error or latency associated with one or more I/O requests from a first virtual machine may lead to the declaration of an unavailability condition that results in the suspension of a second virtual machine that is executing on the same physical machine as the first virtual machine. This is because the monitoring upon which the declaration of the unavailability condition is based takes into account I/O requests from multiple virtual machines executing on the same physical machine.

Figure 5:
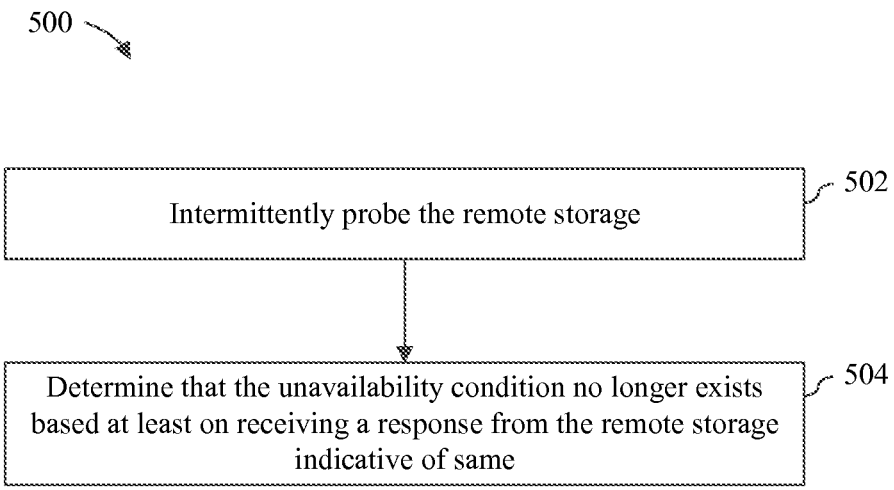
FIG. 5 depicts a flowchart of a first method by which a virtual machine hosting environment may determine that an unavailability condition no longer exists with respect to a remote storage.

A variety of techniques may also be used to determine that the unavailability condition no longer exists during step 208. By way of example, FIG. 5 depicts a flowchart 500 of a first method by which a virtual machine hosting environment may determine that an unavailability condition no longer exists with respect to a remote storage. The method of flowchart 500 will be described with continued reference to system 100 of FIG. 1. However, the method is not limited to that embodiment. For example, the method of flowchart 500 may be performed by any of a wide variety of virtual machine hosting environments other than the particular one shown in FIG. 1.

As shown in FIG. 5, the method of flowchart 500 begins at step 502, in which the virtual machine hosting environment intermittently probes the remote storage. By way of example, this step may be performed when virtual machine I/O monitor 154 intermittently probes remote storage 104. Intermittently probing remote storage 104 may comprise, for example, intermittently sending messages to the remote storage in a lightweight (e.g., relatively infrequent) fashion until a response is received therefrom that indicates that the unavailability condition no longer exists.

At step 504, the virtual machine hosting environment determines that the unavailability condition no longer exists based at least on receiving a response from the remote storage that indicates that the unavailability condition no longer exists. By way of example, this step may be performed when virtual machine I/O monitor 154 determines that the unavailability condition no longer exists based at least on receiving a response from remote storage 104 that indicates that the unavailability condition no longer exists.

Figure 6:
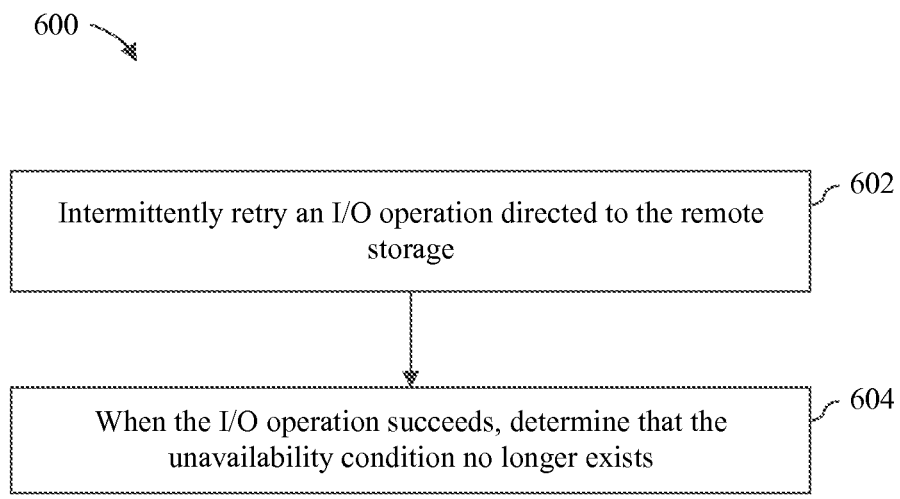
FIG. 6 depicts a flowchart of a second method by which a virtual machine hosting environment may determine that an unavailability condition no longer exists with respect to a remote storage.

FIG. 6 depicts a flowchart 600 of a second method by which a virtual machine hosting environment may determine that an unavailability condition no longer exists with respect to a remote storage. The method of flowchart 600 will be described with continued reference to system 100 of FIG. 1. However, the method is not limited to that embodiment. For example, the method of flowchart 600 may be performed by any of a wide variety of virtual machine hosting environments other than the particular one shown in FIG. 1.

As shown in FIG. 6, the method of flowchart 600 begins at step 602, in which the virtual machine hosting environment intermittently retries an I/O operation directed to the remote storage. By way of example, this step may be performed when virtual machine I/O monitor 154 or some other entity within the virtual machine hosting environment shown in FIG. 1 causes a pending I/O operation directed to remote storage 104 to be retried. The pending I/O operation may be an I/O operation that was initiated by the virtual machine of first child partition 118 or the virtual machine of second child partition 120 and that is being managed by host operating system 140. The pending I/O operation may be one for which an error response was previously received or one for which no response has previously been received.

At step 604, when the I/O operation succeeds, the virtual machine hosting environment determines that the unavailability condition no longer exists. By way of example, this step may be performed when virtual machine I/O monitor 154 determines that the unavailability condition no longer exists when the I/O operation that was retried during step 602 succeeds. The success of the I/O operation may be indicated, for example, by receiving a response from the remote storage that indicates that a read or write operation has completed successfully.

In an alternate embodiment, the virtual machine hosting environment may be operable to terminate the virtual machine in response to at least the determination that the unavailability condition exists with respect to the remote storage and to restart the virtual machine in response to at least the determination that the unavailability condition no longer exists. Such an approach may be utilized, for example, where an application or operating system running on a virtual machine does not respond well to the jump in "wall clock" time that occurs when a virtual machine is suspended and resumed. In such a case, it may be deemed preferable to terminate the virtual machine during a period of remote storage unavailability and restart the virtual machine after such period ends, even if such termination involves crashing of an application or operating system running on the virtual machine.

Figure 7:
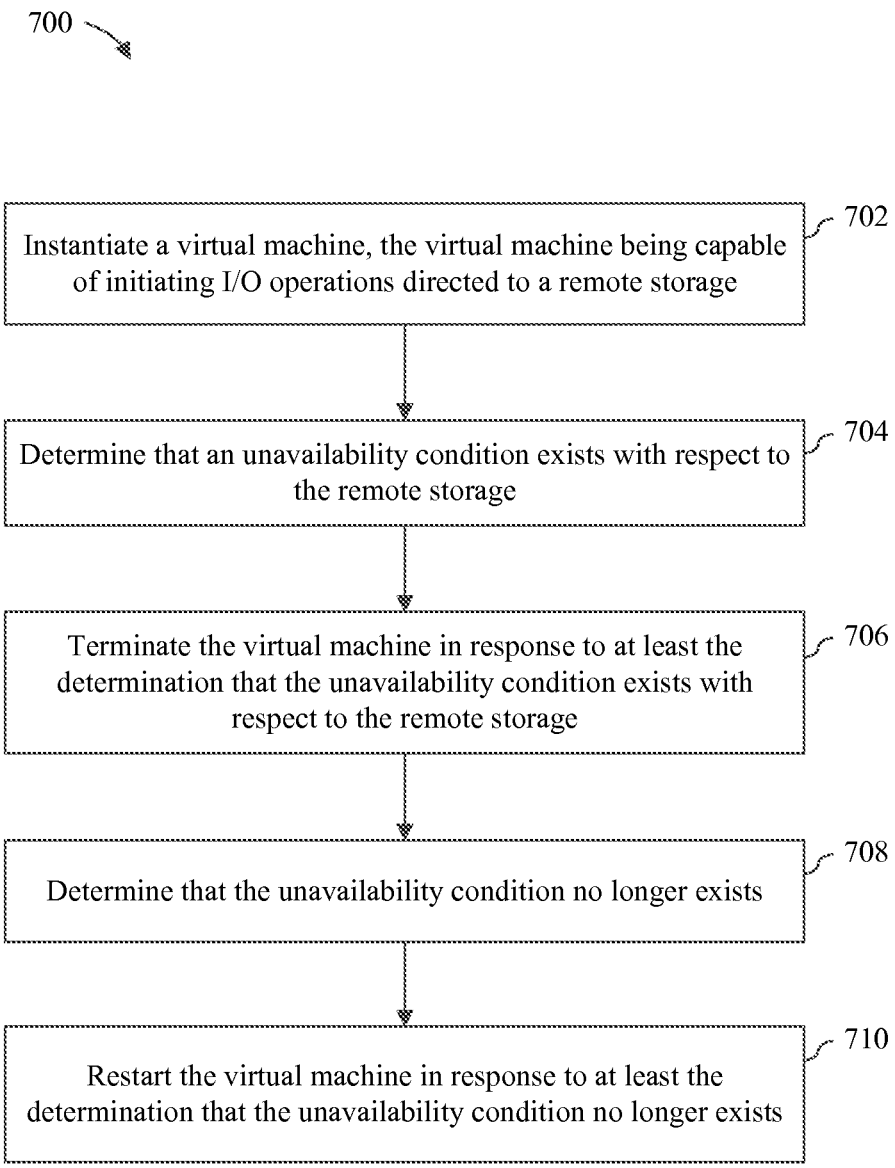
FIG. 7 depicts a flowchart of another method for mitigating the impact of intermittent storage unavailability on virtual machines.

The foregoing alternate approach to mitigating the impact of intermittent storage unavailability on virtual machines will be further described in reference to FIG. 7. In particular, FIG. 7 depicts a flowchart 700 of another method for mitigating the impact of intermittent storage unavailability on virtual machines. The method of flowchart 700 will be described with continued reference to system 100 of FIG. 1. However, the method is not limited to that embodiment. For example, the method of flowchart 700 may be performed by any of a wide variety of virtual machine hosting environments other than the particular one shown in FIG. 1.

As shown in FIG. 7, the method of flowchart 700 begins at step 702 in which a virtual machine hosting environment executing on a physical machine instantiates a virtual machine for execution on the physical machine. The virtual machine is capable of initiating I/O operations directed to a remote storage to which the physical machine is communicatively connected. By way of example, this step may be performed when virtual machine manager 152 executing on physical machine 102 instantiates the virtual machine of first child partition 118 for execution on physical machine 102. As noted above, the virtual machine of first child partition 118 is capable of initiating I/O operations that will ultimately be directed to remote storage 104 to which physical machine 102 is communicatively connected via network(s) 106.

At step 704, the virtual machine hosting environment determines that an unavailability condition exists with respect to the remote storage. By way of example, this step may be performed when virtual machine I/O monitor 154 executing on physical machine 102 determines that an unavailability condition exists with respect to remote storage 104.

At step 706, the virtual machine hosting environment terminates the virtual machine (also referred to as destroying or "tearing down" the virtual machine) in response to at least the determination that the unavailability condition exists with respect to the remote storage. By way of example, this step may be performed when virtual machine manager 152 executing on physical machine 102 terminates the virtual machine of child partition 118 in response to at least receiving a notification from virtual machine I/O monitor 154 that an unavailability condition exists with respect to remote storage 104.

At step 708, the virtual machine hosting environment determines that the unavailability condition no longer exists. By way of example, this step may be performed when virtual machine I/O monitor 154 executing on physical machine 102 determines that an unavailability condition no longer exists with respect to remote storage 104.

At step 710, the virtual machine hosting environment restarts the virtual machine in response to at least the determination that the unavailability condition no longer exists. By way of example, this step may be performed when virtual machine manager 152 executing on physical machine 102 restarts the virtual machine of child partition 118 in response to at least receiving a notification from virtual machine I/O monitor 154 that an unavailability condition no longer exists with respect to remote storage 104.

Further techniques for mitigating the impact of intermittent storage unavailability on virtual machines will now be described with respect to FIG. 8. In particular, FIG. 8 is a block diagram of a system 800 that includes multiple virtual machine hosting environments, each of which is operable to mitigate the impact of intermittent storage unavailability on virtual machines hosted thereby.

Figure 8:
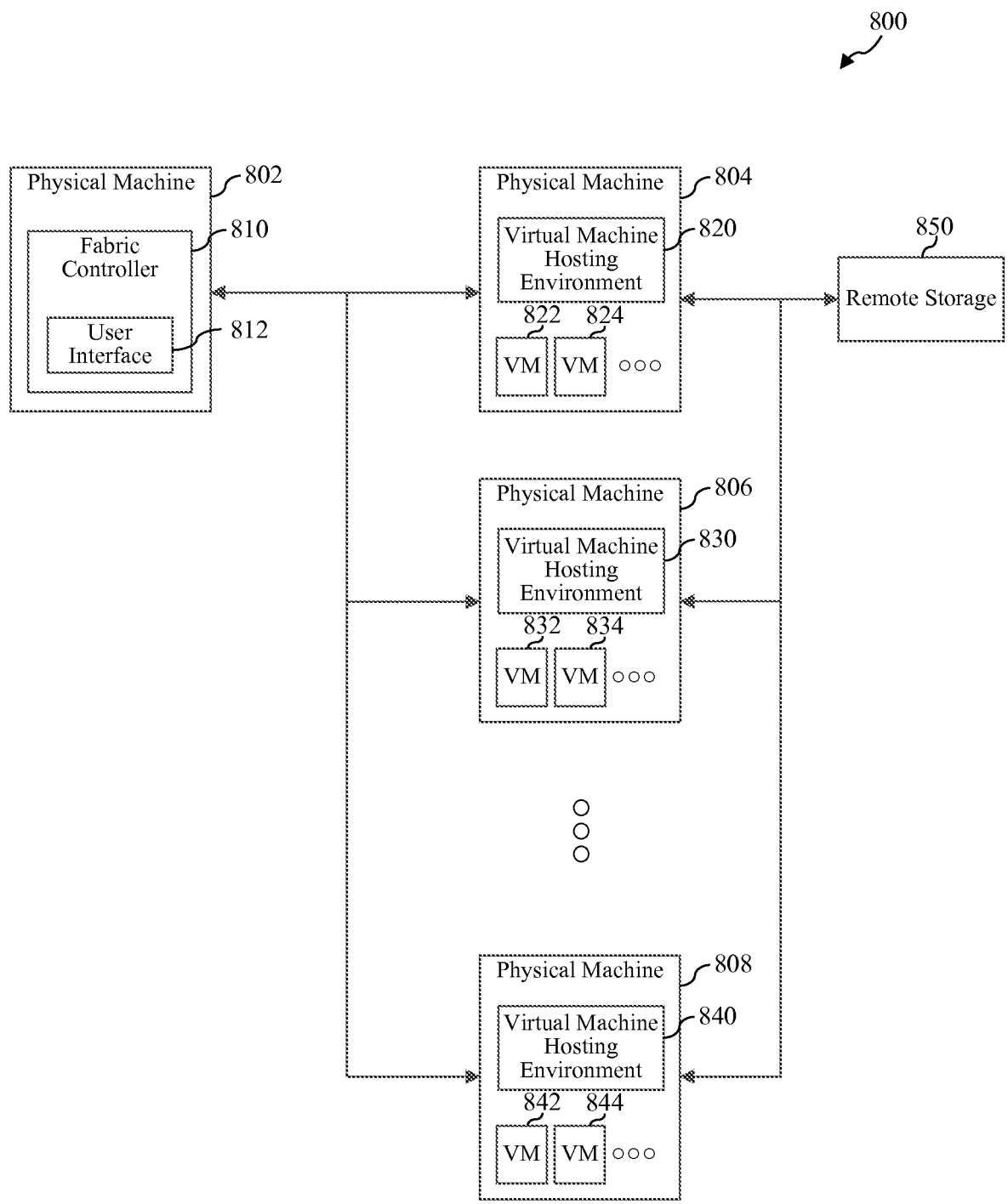
FIG. 8 is a block diagram of a system that includes multiple virtual machine hosting environments, each of which is operable to mitigate the impact of intermittent storage unavailability on virtual machines hosted thereby.

As shown in FIG. 8, system 800 includes a plurality of physical machines that includes at least a physical machine 802, a physical machine 804, a physical machine 806, and a physical machine 808.

Physical machine 804 includes a virtual machine hosting environment 820 that is executed thereon. Virtual machine hosting environment 820 hosts a plurality of virtual machines that include at least a virtual machine 822 and a virtual machine 824. Each of virtual machine 822 and virtual machine 824 is capable of initiating I/O operations directed to a remote storage 850 to which physical machine 804 is communicatively connected. Physical machine 804 and virtual machine hosting environment 820 may be implemented using a software and hardware architecture that is substantially similar to that shown in FIG. 1 and described above.

Physical machine 806 and physical machine 808 are implemented in a like manner to physical machine 804. Thus, as shown in FIG. 8, physical machine 806 includes a virtual machine hosting environment 830 that hosts a plurality of virtual machines including a virtual machine 832 and a virtual machine 834, each of which is capable of initiating I/O operations directed to remote storage 850 to which physical machine 806 is communicatively connected. Likewise, physical machine 808 includes a virtual machine hosting environment 840 that hosts a plurality of virtual machines including a virtual machine 842 and a virtual machine 844, each of which is capable of initiating I/O operations directed to remote storage 850 to which physical machine 806 is communicatively connected.

As further shown in FIG. 8, physical machine 802 is communicatively connected to each of physical machine 804, physical machine 806 and physical machine 808. Physical machine 802 includes a fabric controller 810 installed thereon. Fabric controller 810 comprises a software component that enables a user thereof to monitor and manage each of physical machines 804, 806 and 808 and the virtual machines hosted respectively thereon. Fabric controller 810 may also enable a user thereof to coordinate resources for applications running on such platforms. Fabric controller 810 is operable to provide a user interface (e.g., a graphical user interface) by which a user may invoke the functionality thereof. In one embodiment, fabric controller 810 comprises a MICROSOFT® AZURE® FABRIC CONTROLLER, although this is only an example and is not intended to be limiting.

In one embodiment, fabric controller 810 is operable to enable a user thereof to specify a policy that specifies criteria for determining when an unavailability condition exists with respect to a remote storage, such as remote storage 850. For example, the policy may specify a predefined I/O latency that must be exceed before an unavailability condition may be declared. As another example, the policy may specify a number of I/O error messages that must be received before an unavailability condition may be declared. These are merely a few examples and persons skilled in the relevant art(s) will appreciate that a wide variety of different criteria for declaring an unavailability condition may be specified by a user of fabric controller 810.

In further accordance with this embodiment, the policy may be disseminated from fabric controller 810 to each of virtual machine hosting environment 820, virtual machine hosting environment 830 and virtual machine hosting environment 840 and stored thereby. Each of virtual machine hosting environment 820, virtual machine hosting environment 830 and virtual machine hosting environment 840 may be operable to use the policy received from fabric controller 810 to determine when an unavailability condition exists with respect to remote storage 850. Based on this determination, each of virtual machine hosting environment 820, virtual machine hosting environment 830 and virtual machine hosting environment 840 may pause or terminate one or more of the virtual machines hosted thereby, depending upon the implementation. It is noted that the same or different policies may be disseminated to different virtual machine hosting environments.

Figure 9:
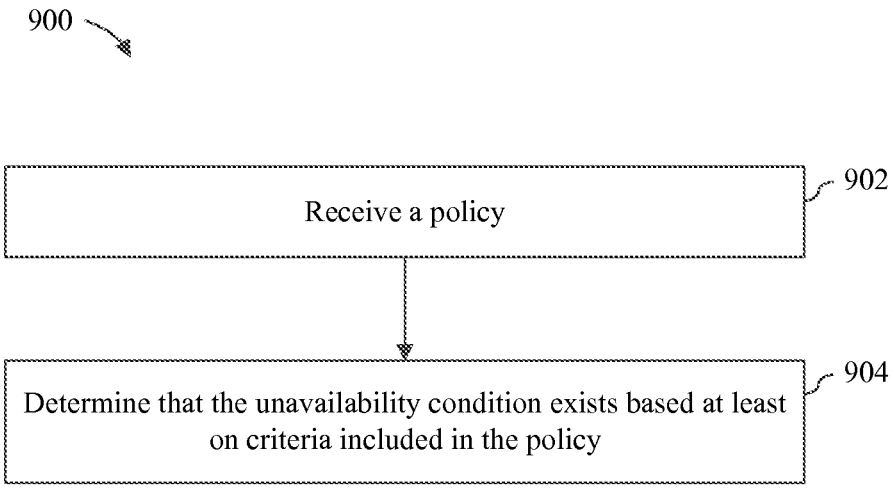
FIG. 9 depicts a flowchart of a third method by which a virtual machine hosting environment may determine that an unavailability condition exists with respect to a remote storage.

The foregoing feature of system 800 will now be further illustrated with respect to FIG. 9. In particular, FIG. 9 depicts a flowchart 900 of a third method by which a virtual machine hosting environment may determine that an unavailability condition exists with respect to a remote storage. The method of flowchart 900 will be described with continued reference to system 800 of FIG. 8. However, the method is not limited to that embodiment.

As shown in FIG. 9, the method of flowchart 900 begins at step 902, in which a policy is received by a virtual machine hosting environment. By way of example, this step may be performed by any of virtual machine hosting environment 820, virtual machine hosting environment 830 or virtual machine hosting environment 840 when such virtual machine hosting environment receives a policy from fabric controller 810. The policy may specify criteria for determining when an unavailability condition exists with respect to a remote storage, such as remote storage 850.

At step 904, the virtual machine hosting environment determines that an unavailability condition exists with respect to the remote storage based at least on the criteria included in the policy. By way of example, this step may be performed by any of virtual machine hosting environment 820, virtual machine hosting environment 830 or virtual machine hosting environment 840 when such virtual machine hosting environment determines that an unavailability condition exists with respect to remote storage 850 based at least on the criteria included in the policy.

In a further embodiment of system 800, fabric controller 810 is operable to enable a user thereof to specify a policy that indicates whether a virtual machine should be suspended and resumed in response to intermittent storage unavailability (e.g., in accordance with the method described above in reference to flowchart 200 of FIG. 2) or whether the virtual machine should be terminated and restarted in response to intermittent storage unavailability (e.g., in accordance with the method described above in reference to flowchart 700 of FIG. 7). This enables a user to selectively apply different policies to different virtual machines. Such selective application may be based on any of a wide variety of factors including but not limited to the applications and/or operating systems executed by the virtual machines and/or user/customer preference. The policy may also specify a set of criteria to be considered by a virtual machine hosting environment in determining which approach (i.e., suspend/resume vs. terminate/restart) to apply to a particular virtual machine.

Figure 10:
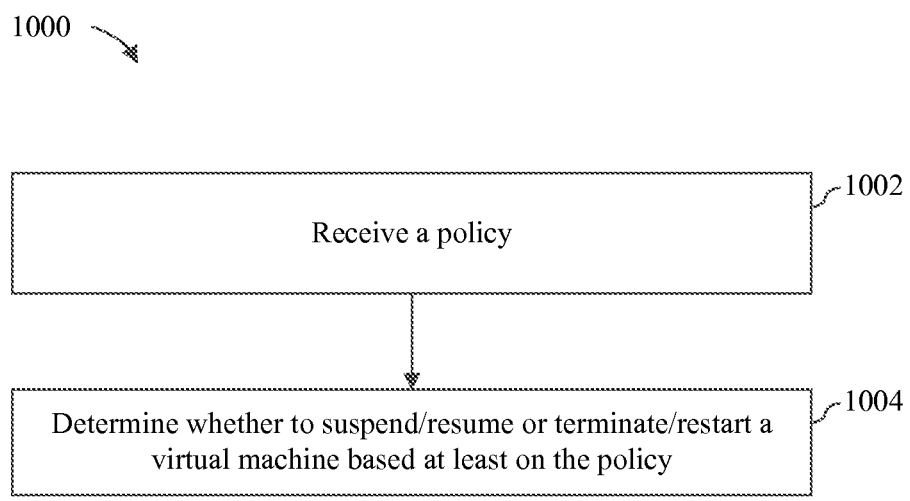
FIG. 10 depicts a flowchart of a method for selecting one of a plurality of techniques for mitigating the impact of intermittent storage unavailability on virtual machines.

The foregoing feature of system 800 will now be further illustrated with respect to FIG. 10. In particular, FIG. 10 depicts a flowchart 1000 of a method for selecting one of a plurality of techniques for mitigating the impact of intermittent storage unavailability on virtual machines. The method of flowchart 1000 will be described with continued reference to system 800 of FIG. 8. However, the method is not limited to that embodiment.

As shown in FIG. 10, the method of flowchart 1000 begins at step 1002, in which a policy is received by a virtual machine hosting environment. By way of example, this step may be performed by any of virtual machine hosting environment 820, virtual machine hosting environment 830 or virtual machine hosting environment 840 when such virtual machine hosting environment receives a policy from fabric controller 810. The policy may indicates whether a virtual machine should be suspended and resumed in response to intermittent storage unavailability (e.g., in accordance with the method described above in reference to flowchart 200 of FIG. 2) or whether the virtual machine should be terminated and restarted in response to intermittent storage unavailability (e.g., in accordance with the method described above in reference to flowchart 700 of FIG. 7). The policy may alternatively specify a set of criteria to be considered in determining which approach (i.e., suspend/resume vs. terminate/restart) to apply to a particular virtual machine.

At step 1004, the virtual machine hosting environment determines whether to suspend/resume or terminate/restart a virtual machine based at least on the policy. By way of example, this step may be performed by any of virtual machine hosting environment 820, virtual machine hosting environment 830 or virtual machine hosting environment 840 when such virtual machine hosting environment determines whether to suspend/resume or terminate/restart a virtual machine hosted thereby based at least on the policy.

In a further embodiment of system 800, each of virtual machine hosting environment 804, virtual machine hosting environment 806 and virtual machine hosting environment 808 may be operable to share I/O status information with the other virtual machine hosting environments and such other virtual machine hosting environments may be operable to utilize the shared I/O status information in determining whether an unavailability condition exists with respect to remote storage 850. Thus, for example, if virtual machine hosting environment 820 is experiencing I/O latency or I/O errors with respect to its own I/O requests to remote storage 850, virtual machine hosting environment 820 may then send I/O status messages to each of virtual machine hosting environment 830 and virtual machine hosting environment 840 to alert them to this fact. Each of virtual machine hosting environment 830 and virtual machine hosting environment 840 may then consider this information in formulating a determination of whether an unavailability condition exists with respect to remote storage 850.

In this manner, peer-to-peer messaging may be leveraged to enable multiple virtual machine hosting environments to react quickly to an unavailability condition with respect to a commonly-used remote storage. The aforementioned I/O status messages may be sent proactively by a virtual machine hosting environment or in response to a query received from another virtual machine hosting environment.

In a further embodiment, fabric controller 810 may be operable to enable a user thereof to select a subset of virtual machine hosting environments that should report I/O status to other virtual machine hosting environments.

Figure 11:
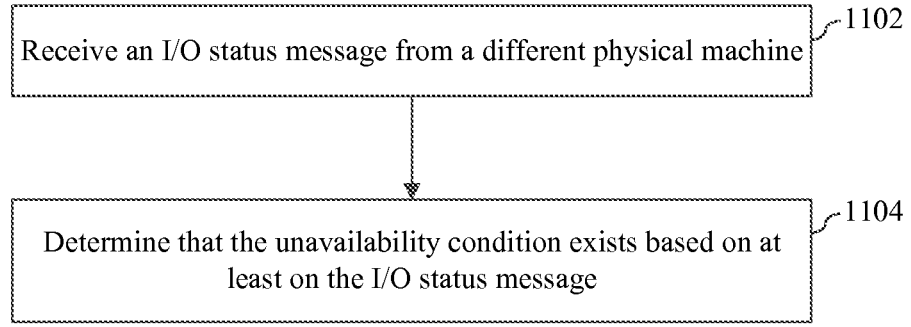
FIG. 11 depicts a flowchart of a fourth method by which a virtual machine hosting environment may determine that an unavailability condition exists with respect to a remote storage.

The foregoing feature of system 800 will now be further illustrated with respect to FIG. 11. In particular, FIG. 11 depicts a flowchart 1100 of a fourth method by which a virtual machine hosting environment may determine that an unavailability condition exists with respect to a remote storage. The method of flowchart 1100 will be described with continued reference to system 800 of FIG. 8. However, the method is not limited to that embodiment.

As shown in FIG. 11, the method of flowchart 1100 begins at step 1102, in which a virtual machine hosting environment executing on a physical machine receives an I/O status message from a different physical machine. By way of example, this step may step may be performed by virtual machine hosting environment 820 executing on physical machine 804 when it receives an I/O status message from virtual machine hosting environment 830 executing on physical machine 806 or from virtual machine hosting environment 840 executing on physical machine 808.

At step 1104, the virtual machine hosting environment determines that an unavailability condition exists with respect to a remote storage based at least on at least I/O status message received during step 1102. By way of example, this step may be performed by virtual machine hosting environment 820 when it determines that an unavailability condition exists with respect to remote storage 850 based at least on the I/O status message received during step 1102.

In a further embodiment of system 800, a similar peer-to-peer messaging approach may be used to help each of virtual machine hosting environment 804, virtual machine hosting environment 806 and virtual machine hosting environment 808 determine whether an unavailability condition no longer exists with respect to remote storage 850. Thus, for example, if virtual machine hosting environment 820 is experiencing successful and/or relatively fast I/O operations with remote storage 850, virtual machine hosting environment 820 may then send I/O status messages to each of virtual machine hosting environment 830 and virtual machine hosting environment 840 to alert them to this fact. Each of virtual machine hosting environment 830 and virtual machine hosting environment 840 may then consider this information in formulating a determination of whether an unavailability condition no longer exists with respect to remote storage 850.

Figure 12:
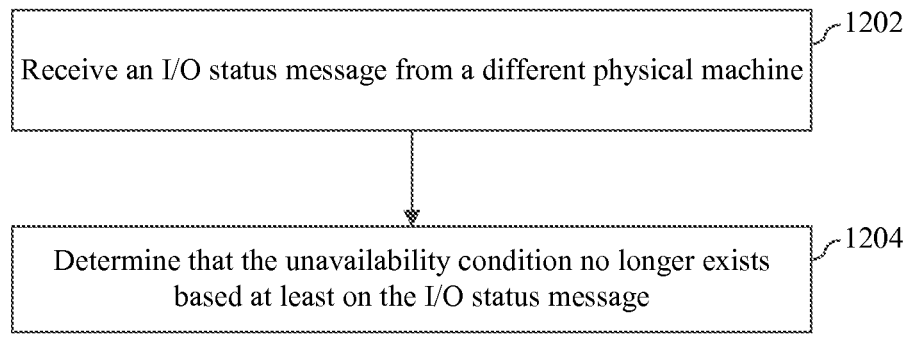
FIG. 12 depicts a flowchart of a third method by which a virtual machine hosting environment may determine that an unavailability condition no longer exists with respect to a remote storage.

The foregoing feature of system 800 will now be further illustrated with respect to FIG. 12. In particular, FIG. 12 depicts a flowchart of a third method by which a virtual machine hosting environment may determine that an unavailability condition no longer exists with respect to a remote storage. The method of flowchart 1200 will be described with continued reference to system 800 of FIG. 8. However, the method is not limited to that embodiment.

As shown in FIG. 12, the method of flowchart 1200 begins at step 1202, in which a virtual machine hosting environment executing on a physical machine receives an I/O status message from a different physical machine. By way of example, this step may step may be performed by virtual machine hosting environment 820 executing on physical machine 804 when it receives an I/O status message from virtual machine hosting environment 830 executing on physical machine 806 or from virtual machine hosting environment 840 executing on physical machine 808.

At step 1204, the virtual machine hosting environment determines that an unavailability condition no longer exists with respect to a remote storage based at least on at least I/O status message received during step 1202. By way of example, this step may be performed by virtual machine hosting environment 820 when it determines that an unavailability condition no longer exists with respect to remote storage 850 based at least on the I/O status message received during step 1202.

III. Example Computer System Implementation

Figure 13:
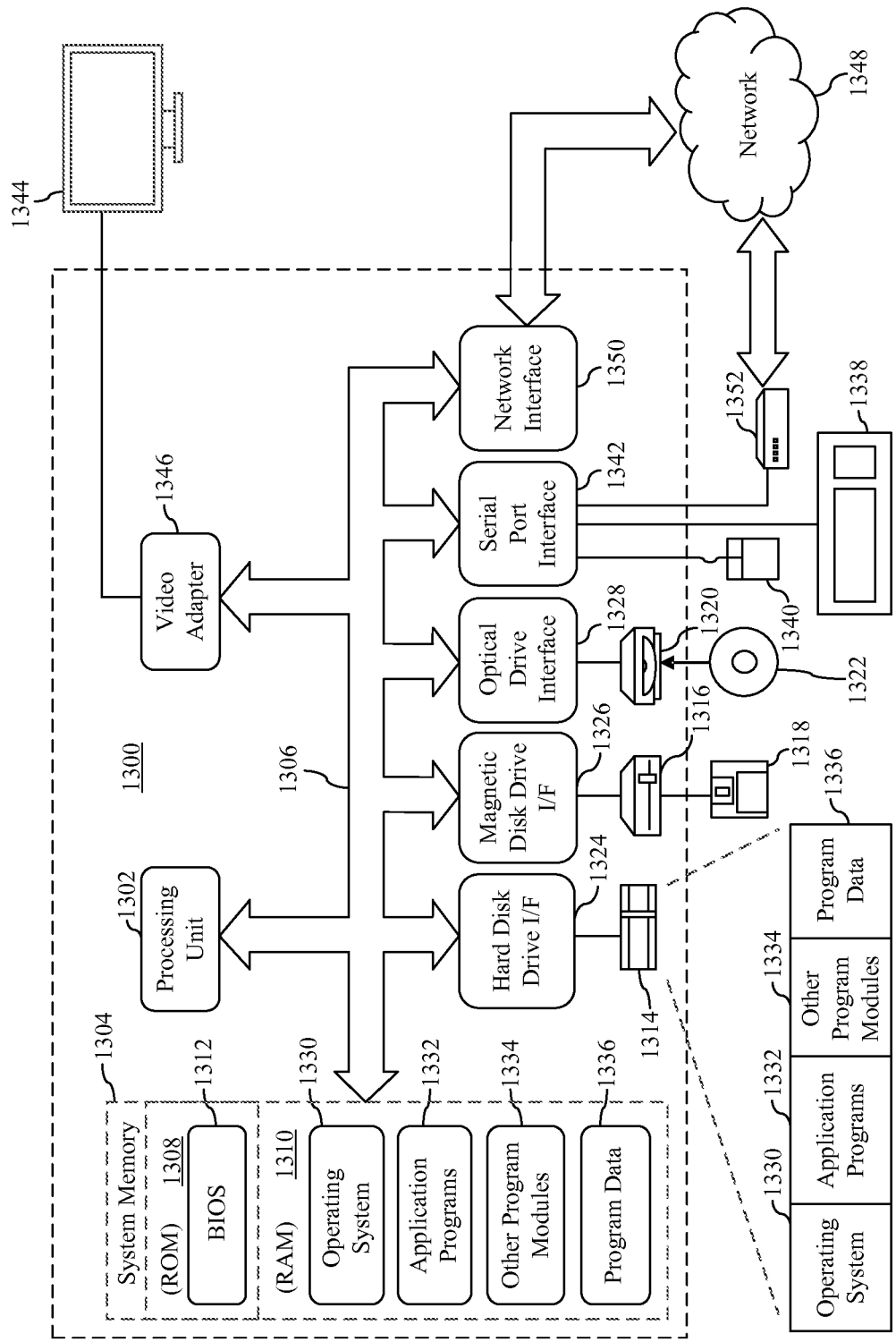
FIG. 13 is a block diagram of an example processor-based computer system that may be used to implement various embodiments.

FIG. 13 depicts an example processor-based computer system 1300 that may be used to implement various embodiments described herein. For example, system 1300 may be used to implement any of physical machine 102, physical machine 802, physical machine 804, physical machine 806 and physical machine 808 as described above in reference to FIGS. 1 and 8. System 1300 may also be used to implement any or all of the steps of any or all of the flowcharts depicted in FIGS. 2-7 and 9-12. The description of system 1300 provided herein is provided for purposes of illustration, and is not intended to be limiting. Embodiments may be implemented in further types of computer systems, as would be known to persons skilled in the relevant art(s).

As shown in FIG. 13, system 1300 includes a processing unit 1302, a system memory 1304, and a bus 1306 that couples various system components including system memory 1304 to processing unit 1302. Processing unit 1302 may comprise one or more microprocessors or microprocessor cores. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random access memory (RAM) 1310. A basic input/output system 1312 (BIOS) is stored in ROM 1308.

System 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, BLU-RAY™ disk or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1330, one or more application programs 1332, other program modules 1334, and program data 1336. In accordance with various embodiments, the program modules may include computer program logic that is executable by processing unit 1302 to perform any or all of the functions and features of physical machine 102, physical machine 802, physical machine 804, physical machine 806 and physical machine 808 as described above in reference to FIGS. 1 and 8. The program modules may also include computer program logic that, when executed by processing unit 1302, performs any of the steps or operations shown or described in reference to the flowcharts of FIGS. 2-7 and 9-12.

A user may enter commands and information into system 1300 through input devices such as a keyboard 1338 and a pointing device 1340 (e.g., a mouse). Other input devices (not shown) may include a microphone, joystick, game controller, scanner, or the like. In one embodiment, a touch screen is provided in conjunction with a display 1344 to allow a user to provide user input via the application of a touch (as by a finger or stylus for example) to one or more points on the touch screen. These and other input devices are often connected to processing unit 1302 through a serial port interface 1342 that is coupled to bus 1306, but may be connected by other interfaces, such as a parallel port, game port, or a universal serial bus (USB). Such interfaces may be wired or wireless interfaces.

Display 1344 is connected to bus 1306 via an interface, such as a video adapter 1346. In addition to display 1344, system 1300 may include other peripheral output devices (not shown) such as speakers and printers.

System 1300 is connected to a network 1348 (e.g., a local area network or wide area network such as the Internet) through a network interface or adapter 1350, a modem 1352, or other suitable means for establishing communications over the network. Modem 1352, which may be internal or external, is connected to bus 1306 via serial port interface 1342.

As used herein, the terms "computer program medium," "computer-readable medium," and "computer-readable storage medium" are used to generally refer to memory devices or storage structures such as the hard disk associated with hard disk drive 1314, removable magnetic disk 1318, removable optical disk 1322, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1332 and other program modules 1334) may be stored on the hard disk, magnetic disk, optical disk, ROM, or RAM. Such computer programs may also be received via network interface 1350, serial port interface 1342, or any other interface type. Such computer programs, when executed or loaded by an application, enable system 1300 to implement features of embodiments of the present invention discussed herein. Accordingly, such computer programs represent controllers of the system 1300.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

In alternative implementations, system 1300 may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

IV. Additional Exemplary Embodiments

An apparatus is described herein. The apparatus comprises a first physical machine that includes at least one processor and a memory that stores a virtual machine hosting environment for execution by the at least one processor. The virtual machine hosting environment comprises a virtual machine manager and a virtual machine I/O monitor. The virtual machine manager is operable to instantiate a virtual machine for execution by the at least one processor. The virtual machine is capable of initiating I/O operations directed to a remote storage to which the first physical machine is communicatively connected. The virtual machine I/O monitor is operable to determine that an unavailability condition exists with respect to the remote storage and to subsequently determine that the unavailability condition no longer exists. The virtual machine manager is further operable to suspend the virtual machine in response to at least the determination by the virtual machine I/O monitor that the unavailability condition exists with respect to the remote storage and to resume the virtual machine in response to at least the determination by the virtual machine I/O monitor that the unavailability condition no longer exists.

In one embodiment of the foregoing apparatus, the virtual machine I/O monitor is operable to determine that the unavailability condition exists by monitoring at least one I/O operation initiated by the virtual machine and directed to the remote storage. In further accordance with such an embodiment, the virtual machine I/O monitor may be operable to determine that the unavailability condition exists based at least on the latency associated with at least one I/O operation or based at least on an I/O error associated with at least one I/O operation.

In another embodiment of the foregoing apparatus, the virtual machine manager is operable to instantiate a plurality of virtual machines for execution by at least one processor, each of the plurality of virtual machines being capable of initiating I/O operations directed to the remote storage. In further accordance with such an embodiment, the virtual machine I/O monitor is operable to determine that the unavailability condition exists by monitoring a plurality of I/O operations respectively initiated by the plurality of virtual machines and directed to the remote storage.

In yet another embodiment of the foregoing apparatus, the virtual machine I/O monitor is operable to determine that the unavailability condition exists based on at least one I/O status message received from at least a second physical machine to which the first physical machine is communicatively connected.

In still another embodiment of the foregoing apparatus, the virtual machine I/O monitor is operable to determine that the unavailability condition exists based on criteria included in a user-specified policy.

In a further embodiment of the foregoing apparatus, the virtual machine I/O monitor is be operable to determine that the unavailability condition no longer exists by intermittently probing the remote storage until a response is received therefrom that indicates that the unavailability condition no longer exists.

In a still further embodiment of the foregoing apparatus, the virtual machine I/O monitor is operable to determine that the unavailability condition no longer exists by intermittently retrying an I/O operation directed to the remote storage until the I/O operations succeeds.

In another embodiment of the foregoing apparatus, the virtual machine I/O monitor may be operable to determine that the unavailability condition no longer exists based at least one I/O status message received from at least a second physical machine to which the first physical machine is communicatively connected.

In yet another embodiment of the foregoing apparatus, the virtual machine manager is further operable to save one or more pending I/O requests generated by the virtual machine in conjunction with pausing the virtual machine and to send the one or more pending I/O requests to the remote storage in conjunction with resuming the virtual machine.

A system is also described herein. The system includes a storage system and a first computer communicatively connected to the storage system. The first computer has installed for execution thereon a virtual machine hosting environment operable to instantiate a virtual machine for execution on the first computer. The virtual machine is capable of initiating I/O operations directed to the storage system. The virtual machine hosting environment is further operable to determine that an unavailability condition exists with respect to the storage system, to suspend the virtual machine in response to the determination that the unavailability condition exists, to determine that the unavailability condition no longer exists, and to resume the virtual machine in response to at least the determination that the unavailability condition no longer exists.

In one embodiment of the foregoing system, the virtual machine hosting environment is operable to determine that the unavailability condition exists by monitoring at least one I/O operation initiated by the virtual machine and directed to the storage system.

In another embodiment of the foregoing system, the system further includes a second computer that is communicatively connected to the first computer and operable to send an I/O status message to the first computer. In accordance with such an embodiment, the virtual machine hosting environment is operable to determine that the unavailability condition exists based on at least the I/O status message.

In yet another embodiment of the foregoing system, the system further includes a fabric controller executing on a second computer that is communicatively connected to the first computer and operable to send a user-specified policy to the first computer. In accordance with such an embodiment, the virtual machine hosting environment is operable to determine that the unavailability condition exists based on criteria included in the user-specified policy.

In still another embodiment of the foregoing system, the virtual machine hosting environment is operable to determine that the unavailability condition no longer exists by intermittently probing the storage system until a response is received therefrom that indicates that the unavailability condition no longer exists.

In a further embodiment of the foregoing system, the virtual machine hosting environment is operable to determine that the unavailability condition no longer exists by intermittently retrying an I/O operation directed to the storage system until the I/O operations succeeds.

In a still further embodiment of the foregoing system, the system further includes a second computer that is communicatively connected to the first computer and operable to send an I/O status message to the first computer and the virtual machine hosting environment is operable to determine that the unavailability condition no longer exists based on at least the I/O status message.

In another embodiment of the foregoing system, the virtual machine hosting environment is further operable to save one or more pending I/O requests generated by the virtual machine in conjunction with pausing the virtual machine and to send the one or more pending I/O requests to the remote storage in conjunction with resuming the virtual machine.

A method performed by a virtual machine hosting environment executing on a physical machine is also described herein. The method includes instantiating a virtual machine for execution on the physical machine, the virtual machine being capable of initiating input/output (I/O) operations directed to a remote storage to which the physical machine is communicatively connected, determining that an unavailability condition exists with respect to the remote storage, terminating the virtual machine in response to at least the determination that the unavailability condition exists with respect to the remote storage, determining that the unavailability condition no longer exists, and restarting the virtual machine in response to at least the determination that the unavailability condition no longer exists.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An apparatus, comprising:
a first physical machine comprising at least one processor and a memory that stores a virtual machine hosting environment for execution by the at least one processor, the virtual machine hosting environment comprising:
a virtual machine manager operable to instantiate a virtual machine for execution by the at least one processor, the virtual machine being capable of initiating input/output (I/O) operations directed to a remote storage to which the first physical machine is communicatively connected;
a virtual machine I/O monitor operable to determine that an unavailability condition exists with respect to the remote storage and to subsequently determine that the unavailability condition no longer exists, the virtual machine I/O monitor being operable to determine that the unavailability condition no longer exists by at least one of:
intermittently probing the remote storage until a response is received therefrom that indicates that the unavailability condition no longer exists; or
intermittently retrying an I/O operation directed to the remote storage until the I/O operations succeed, the retried I/O operation being a previously-issued I/O operation that failed as a result of the unavailability operation;
the virtual machine manager being further operable to suspend the virtual machine in response to at least the determination by the virtual machine I/O monitor that the unavailability condition exists with respect to the remote storage and to resume the virtual machine on the first physical machine in response to at least the determination by the virtual machine I/O monitor that the unavailability condition no longer exists; and
the virtual machine manager is further operable to save one or more pending I/O requests generated by the virtual machine in conjunction with suspending the virtual machine and to send the one or more pending I/O requests to the remote storage in conjunction with resuming the virtual machine on the first physical machine.

2. The apparatus of claim 1, wherein the virtual machine I/O monitor is operable to determine that the unavailability condition exists by monitoring at least one I/O operation initiated by the virtual machine and directed to the remote storage.

3. The apparatus of claim 2, wherein the virtual machine I/O monitor is operable to determine that the unavailability condition exists based at least on a latency associated with the at least one I/O operation.

4. The apparatus of claim 2, wherein the virtual machine I/O monitor is operable to determine that the unavailability condition exists based at least on an I/O error associated with the at least one I/O operation.

5. The apparatus of claim 1, wherein:
the virtual machine manager is operable to instantiate a plurality of virtual machines for execution by the at least one processor, each of the plurality of virtual machines being capable of initiating I/O operations directed to the remote storage; and
the virtual machine I/O monitor is operable to determine that the unavailability condition exists by monitoring a plurality of I/O operations respectively initiated by the plurality of virtual machines and directed to the remote storage.

6. The apparatus of claim 1, wherein the virtual machine I/O monitor is operable to determine that the unavailability condition exists based on at least one I/O status message received from at least a second physical machine to which the first physical machine is communicatively connected.

7. The apparatus of claim 1, wherein the virtual machine I/O monitor is operable to determine that the unavailability condition exists based on criteria included in a user-specified policy.

8. The apparatus of claim 1, wherein the virtual machine I/O monitor is further operable to determine that the unavailability condition no longer exists based at least one I/O status message received from at least a second physical machine to which the first physical machine is communicatively connected.

9. A system, comprising:
a storage system; and
a first computer communicatively connected to the storage system and having installed for execution thereon:
a virtual machine hosting environment operable to instantiate a virtual machine for execution on the first computer, the virtual machine being capable of initiating input/output (I/O) operations directed to the storage system, the virtual machine hosting environment being further operable to:
determine that an unavailability condition exists with respect to the storage system,
suspend the virtual machine in response to at least the determination that the unavailability condition exists,
determine, by a virtual machine I/O monitor of the virtual machine hosting environment, that the unavailability condition no longer exists by at least one of:
intermittently probing, by the virtual machine I/O monitor, the storage system until a response is received therefrom that indicates that the unavailability condition no longer exists; or
intermittently retrying, by the virtual machine I/O monitor, an I/O operation directed to the storage system until the I/O operations succeed, the retried I/O operation being a previously-issued I/O operation that failed as a result of the unavailability operation, and
resume the virtual machine on the first computer in response to at least the determination that the unavailability condition no longer exists, the virtual machine hosting environment being further operable to save one or more pending I/O requests generated by the virtual machine in conjunction with suspending the virtual machine and to send the one or more pending I/O requests to the storage system in conjunction with resuming the virtual machine on the first computer.

10. The system of claim 9, wherein the virtual machine hosting environment is operable to determine that the unavailability condition exists by monitoring at least one I/O operation initiated by the virtual machine and directed to the storage system.

11. The system of claim 10, wherein the virtual machine hosting environment is operable to determine that the unavailability condition exists based at least on a latency associated with the at least one I/O operation.

12. The system of claim 10, wherein the virtual machine hosting environment is operable to determine that the unavailability condition exists based at least on an I/O error associated with the at least one I/O operation.

13. The system of claim 9, further comprising:
a second computer that is communicatively connected to the first computer and operable to send an I/O status message to the first computer;
wherein the virtual machine hosting environment is operable to determine that the unavailability condition exists based on at least the I/O status message.

14. The system of claim 9, further comprising:
a fabric controller executing on a second computer that is communicatively connected to the first computer and operable to send a user-specified policy to the first computer;
wherein the virtual machine hosting environment is operable to determine that the unavailability condition exists based on criteria included in the user-specified policy.

15. The system of claim 9, further comprising:
a second computer that is communicatively connected to the first computer and operable to send an I/O status message to the first computer;
wherein the virtual machine hosting environment is further operable to determine that the unavailability condition no longer exists based on at least the I/O status message.

16. A method performed by a virtual machine hosting environment executing on a physical machine, comprising:
instantiating a virtual machine for execution on the physical machine, the virtual machine being capable of initiating input/output (I/O) operations directed to a remote storage to which the physical machine is communicatively connected;
determining that an unavailability condition exists with respect to the remote storage;
terminating the virtual machine in response to at least the determination that the unavailability condition exists with respect to the remote storage and saving one or more pending I/O requests generated by the virtual machine;
determining, by a virtual machine I/O monitor of the virtual machine hosting environment, that the unavailability condition no longer exists by at least one of:
intermittently probing, by the virtual machine I/O monitor, the remote storage until a response is received therefrom that indicates that the unavailability condition no longer exists; or
intermittently retrying, by the virtual machine I/O monitor, an I/O operation directed to the remote storage until the I/O operations succeed, the retried I/O operation being a previously-issued I/O operation that failed as a result of the unavailability operation; and
restarting the virtual machine on the physical machine in response to at least the determination that the unavailability condition no longer exists and sending the one or more pending I/O requests to the remote storage.

17. The method of claim 16, wherein determining that the unavailability condition exists comprises:
monitoring at least one I/O operation initiated by the virtual machine and directed to the remote storage.

18. The method of claim 16, wherein determining that the unavailability condition exists comprises:
determining that the unavailability condition exists based at least on a latency associated with the at least one I/O operation.

19. The method of claim 16, wherein determining that the unavailability condition exists comprises:
determining that the unavailability condition exists based at least on an I/O error associated with the at least one I/O operation.

20. The method of claim 16, wherein determining that the unavailability condition exists comprises:
determining that the unavailability condition exists based on criteria included in a user-specified policy.

* * * * *